United States Patent
Koesler et al.

(10) Patent No.: US 10,795,685 B2
(45) Date of Patent: *Oct. 6, 2020

(54) OPERATING A PIPELINE FLATTENER IN ORDER TO TRACK INSTRUCTIONS FOR COMPLEX

(71) Applicant: TEXAS INSTRUMENTS INCORPORATED, Dallas, TX (US)

(72) Inventors: Markus Koesler, Landshut (DE); Johann Zipperer, Unterschleissheim (DE); Christian Wiencke, Garching (DE); Wolfgang Lutsch, Freising Bayern (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,832

(22) Filed: Apr. 9, 2019

(65) Prior Publication Data
US 2019/0303166 A1    Oct. 3, 2019

Related U.S. Application Data

(63) Continuation of application No. 15/286,642, filed on Oct. 6, 2016, now Pat. No. 10,255,078, which is a (Continued)

(30) Foreign Application Priority Data

Aug. 16, 2011 (DE) .................. 10 2011 110 151

(51) Int. Cl.
*G06F 9/38*    (2018.01)
*G06F 11/36*    (2006.01)
(Continued)

(52) U.S. Cl.
CPC ........ *G06F 9/3867* (2013.01); *G06F 9/30098* (2013.01); *G06F 9/3802* (2013.01);
(Continued)

(58) Field of Classification Search
CPC ..................... G06F 11/3636; G06F 11/3648
See application file for complete search history.

(56) References Cited

U.S. PATENT DOCUMENTS 6,247,119 B1    6/2001 Matt
6,331,957 B1   12/2001 Kurts et al.
(Continued)

OTHER PUBLICATIONS

"Pipeline Flattener," from Texas Instruments Embedded Processors Wiki, http://processors.wiki.ti.com/index.php/Pipeline_Flattener, May 27, 2010.

(Continued)

*Primary Examiner* — Jacob Petranek
(74) *Attorney, Agent, or Firm* — Brian D. Graham; Charles A. Brill; Frank D. Cimino

(57) ABSTRACT

A semiconductor device comprising a processor having a pipelined architecture and a pipeline flattener and a method for operating a pipeline flattener in a semiconductor device are provided. The processor comprises a pipeline having a plurality of pipeline stages and a plurality of pipeline registers that are coupled between the pipeline stages. The pipeline flattener comprises a plurality of trigger registers for storing a trigger, wherein the trigger registers are coupled between the pipeline stages.

16 Claims, 6 Drawing Sheets

Related U.S. Application Data continuation of application No. 13/473,260, filed on May 16, 2012, now Pat. No. 9,489,208.

(51) Int. Cl.
    *G06F 11/267*     (2006.01)
    *G06F 9/30*     (2018.01)

(52) U.S. Cl.
    CPC .......... *G06F 9/3869* (2013.01); *G06F 11/267* (2013.01); *G06F 11/3636* (2013.01); *G06F 11/3648* (2013.01)

(56) References Cited

U.S. PATENT DOCUMENTS

| | | |
|---|---|---|
| 2004/0103271 A1 | 5/2004 | Agarwala et al. |
| 2004/0177288 A1 | 9/2004 | Swoboda |
| 2009/0089547 A1 | 4/2009 | Moyer |
| 2012/0226838 A1 | 9/2012 | Visalli et al. |

OTHER PUBLICATIONS

"Trace Device Features," from Texas Instruments Embedded Processors Wiki, http://processors.wiki.ti.com/index.php/TraceDeviceFeatures, Sep. 7, 2010.

OPERATING A PIPELINE FLATTENER IN ORDER TO TRACK INSTRUCTIONS FOR COMPLEX

CROSS-REFERENCE TO RELATED APPLICATIONS

This application is a continuation of U.S. patent application Ser. No. 15/286,642, filed on Oct. 6, 2016, which is a continuation of U.S. patent application Ser. No. 13/473,260, filed on May 16, 2012, which claims priority to German Patent Application No. 10 2011 110 151.2, filed on Aug. 16, 2011, all of which are hereby incorporated by reference for all purposes.

BACKGROUND

Today's microcontrollers have a highly integrated and complex architecture. It is common or even necessary to provide an on-chip debug logic allowing a user or software developer to debug the program code of an application that is currently under development on the original application board. Most microcontrollers comprise a debug unit or logic according that is coupled through an interface using the widespread JTAG-standard. This additional logic must be implemented on chip in order to provide the functionality needed. A common and basic feature for debugging is a code breakpoint that stops the execution of an application if a predefined instruction is reached. Typically, the instruction is identified by its memory address in an instruction register, which often referred to as program counter (or short PC). This debug functionality may be realized by simply monitoring the address lines of an instruction fetch unit of the microcontroller, e.g. by help of a bus comparator. However, more complex breakpoints may be desirable. These breakpoints may not only consider the instruction address but also the data that is transferred by the instruction. Even more complex breakpoints may consider additional criteria.

A stopping breakpoint is one of the simple debug actions which halts application processing upon fulfilling the breakpoint condition. Other debug actions may also take place, e.g. a trace transaction or a debug interrupt.

It is a general goal during debugging to correlate the instruction with the data which is transferred due to the execution of the instruction. This might be a challenging task since the fetch of the instruction and the correlated data transfer do not take place at the same time. For a non-pipelined processor (CPU) having a combined instruction and data bus (in the following also referred to as a memory bus), the instructions are executed in sequence and a correlation between the instruction and the resulting data transfer may easily be established.

FIG. 6 is a schematic illustration of the bus activity for a number of subsequent clock cycles within such a system. Exemplarily, a first instruction In1 is fetched and a read operation is performed due to this instruction. Accordingly, during the first two clock cycles, the instruction fetch of the first instruction In1 and the respective read operation (Read OP) may be monitored at the memory bus. Further, this first instruction In1 causes a write operation (Write OP) to memory address Rx0. This action may be monitored at the CPU register. An exemplary second and third instruction In2 and In3 perform similar operations and write data to memory addresses Rx1 and Rx2.

However, modern processors often have a pipelined architecture. According to this processor architecture, the execution of an instruction is separated into a plurality of sub-actions which are executed by successive stages of a processor pipeline. At a given point in time, several different instructions may be executed by the different pipeline stages. This technique which is also known as pipelining increases the overall performance of the processor.

FIG. 7 exemplarily illustrates five stages of a classical RISC machine. The different stages are: instruction fetch (IF), instruction decode (ID), execute (EX), memory access (MEM) and register write back (WB). An instruction follows through the pipeline stages of the processor pipeline during subsequent clock cycles, as it is indicated by the horizontal columns. During the exemplary clock cycle 4, the first instruction performs a memory access (MEM), the second instruction is executed (EX), a third instruction is decoded (ID) and a fourth instruction is fetched (IF). During clock cycle 4, the fifth stage of the pipeline, namely the register write back-stage, is idle.

Pipelined processors are organized in which the pipeline stages can semi-independently work on separate jobs. Each stage is organized and linked in a chain, i.e. the pipeline, and each stage's output is fed to a subsequent stage until the job is done. The overall processing time is significantly reduced. However, it is not possible to observe all of the activity associated with the execution of the instruction by observing the memory interface alone.

This problem is illustrated in FIG. 8 which is a schematic view to the bus transactions of a pipelined processor having a combined instruction and data bus. During a first clock cycle, an exemplary first instruction In1 is fetched. In a second clock cycle, the memory bus is idle and during a third clock cycle, a second instruction In2 is fetched. Further, in a fourth clock cycle, the first instruction In1 performs a read operation while in a fifth clock cycle a third operation In3 is fetched. By simply monitoring the bus activity, it is not possible to correlate an instruction and a data transfer caused by this instruction.

A countermeasure to this problem consists in providing a pipeline flattener (also known as a flattener circuit) buffering or delaying the pipeline signals. In principle, a pipeline flattener is a first-in-first-out (FIFO) circuit. Different signals from different pipeline stages are delayed by different amounts of time and the pipeline flattener outputs all information of a given instruction even though this information was gathered at different points in time during execution of the instruction. A pipeline flattener tracks all actions of an instruction through the pipeline. When the instruction exits the pipeline of the processor, connected debug logic may reconstruct the instruction. In its simplest version, the instruction is identified by its address which is tracked through the pipeline stages together with the instruction.

FIG. 9 illustrates this for an exemplary pipeline having a depth of five stages. In a first stage, a first instruction In1 is fetched from the instruction register. The instruction is identified by its instruction address IAddr. This identifier is fed through every stage of the pipeline. Consequently, data transactions which are due to the execution of this instruction may be correlated to the respective instruction. Exemplarily, in FIG. 9, the fifth instruction In5 performs a register write back and the debug logic may correlate this action with the instruction by help of the address IAddr (In5).

However, a pipeline flattener has a high gate count that is nearly equal to the number of gates which are used for the processor pipeline itself. Considering a 32-bit address, for a five stage pipeline 32*5=160 flops are necessary for tracking the instruction address in the debug logic. Typically, a pipeline flattener not only tracks the instruction address but also additional status signals. This will lead to a number of necessary flops being significantly higher than the above-estimated value. Especially for cost and power sensitive applications, these extensive debug solutions are undesirable due to their high gate count and high power consumption.

SUMMARY

In an aspect of the invention, a semiconductor device comprising a processor having a pipelined architecture and a pipeline flattener is provided. The processor comprises a pipeline having a plurality of pipeline stages and a plurality of pipeline registers which are coupled between the pipeline stages. The pipeline flattener may further comprise a plurality of trigger registers for storing a trigger. Preferably, this trigger value indicates a status of a corresponding instruction which is fed through the pipeline. This status information indicates whether or not the instruction is selected for debug tracking. In an embodiment, the trigger is a single-bit value wherein a "1" indicates that the instruction is selected for tracking and a "0" indicates that the respective instruction is not selected. The trigger registers may be coupled between the pipeline stages. The pipeline flattener is advantageously configured to set the trigger register of the pipeline stage which receives an instruction to a predetermined trigger value indicating that the received instruction is selected for debug tracing. The trigger is forwarded through the trigger registers of the pipeline together with the received instruction. It may then be determined whether the trigger indicates that the assigned instruction is selected for debug handling. If the result of the previous determination step is positive, the tracked debug data is provided to a debug unit of the semiconductor device.

According to these aspects of the invention, the high gate count and high power consumption known from prior art debug systems are reduced. Instead of tracking all signals through the pipeline of a processor, the semiconductor device according to aspects of the invention provides the technical option to mark or label instructions which are of interest by the trigger. If an instruction enters the pipeline of the processor at the fetch stage, it is assigned to a trigger indicating the status of the instruction, i.e. whether or not it is selected for tracing. The trigger follows the instruction through the pipeline of the processor and—in the minimal configuration—only a single bit is needed. If a data transaction occurs at a bus interface, the respective trigger information signals that this data transaction is due to the marked instruction. Debug logic of a semiconductor device may observe the data bus and may consider the trigger information.

According to another aspect of the invention, the trigger registers are coupled in parallel to the respective pipeline registers for each pipeline stage. In other words, there is a trigger register for each pipeline register. According to this aspect, each result of a pipeline stage which is temporarily stored in the respective pipeline register may be monitored by the debug unit. The trigger information is checked and if the trigger indicates that the instruction is selected for debug tracking, the debug unit may capture the necessary information.

In another embodiment of the invention, the pipeline flattener may comprise a counter unit for providing a sequential counter to each instruction entering the pipeline. Further, the pipeline flattener may comprise a plurality of counter registers which are configured to receive the counter from the counter unit. The counter registers may be coupled in parallel to the pipeline registers. It is understood that a trigger register may also act as a counter register which means that the hardware implementation may be identical to the abovementioned embodiments despite of the fact that additional space for the counter is present in the trigger registers. According to another implementation, the trigger registers may be implemented as separate hardware registers and so, the semiconductor device according to this aspect of the invention is suitable for both, i.e. forwarding trigger information and counter information through the pipeline of the processor.

According to another aspect of the invention, a method for operating a pipeline flattener in a semiconductor device is provided. The semiconductor device comprises a processor having a pipelined architecture wherein the processor comprises a pipeline having a plurality of pipeline stages. A plurality of pipeline registers may be coupled between the pipeline stages and trigger registers may be coupled in parallel to each pipeline register. According to an aspect of the invention, the trigger register of the pipeline stage which receives an instruction (typically the fetch stage of the pipeline) may be set to a predetermined value which indicates whether or not the received instruction is selected for debug tracing. Further, the trigger may be forwarded through the trigger registers of the pipeline together with the received instruction. As already mentioned, forwarding of instruction and trigger information may be performed by help of separate registers, i.e. pipeline registers and trigger registers. Also a combined instruction and trigger register may be applied. The trigger indicates whether the assigned instruction is selected for debug tracking. Accordingly, the pipeline flattener may provide tracked debug data to a debug unit of the semiconductor device.

In another aspect of the invention, it is determined whether an operation which is performed by one of the pipeline stages matches a further debug tracing criterion. This determination may be performed by monitoring or surveying the bus of the respective pipeline stage. If the debug criterion is not matched, the trigger of the corresponding trigger register is set to a predetermined trigger value indicating that the respective instruction is not selected for further debug tracking. Advantageously, a complex debug breakpoint may be realized.

In another aspect of the invention, another method for operating a pipeline flattener in a semiconductor device comprising a processor having a pipelined architecture is provided. The processor comprises a pipeline having a plurality of pipeline stages and a plurality of pipeline registers which are coupled between the pipeline stages. A trigger register is coupled in parallel to each pipeline stage. The pipeline flattener may further comprise a counter unit for providing a sequential counter to instructions entering the pipeline. A counter register may be coupled in parallel to each pipeline register between the pipeline stages. According to aspects of the invention, after reception and selection of an instruction for tracing, the respective counter may be set to a counter value which identifies the selected instruction. This counter may be forwarded through the counter registers of the pipeline together with the selected instruction. Debug data may be provided to a debug unit of the semiconductor device. Advantageously, a data transfer which is due to a specific instruction may be identified by help of the corresponding subsequent counter.

Advantageously, the bit-depth of the counter is higher than the binary value of the number of stages of the pipeline. Exemplarily, a 3-bit counter allows encoding up to eight instructions. Accordingly this bit-depth is suitable for pipelines having up to eight stages. Each instruction entering the pipeline may unambiguously be identified at the end of the pipeline by help of the counter value.

Same or similar advantages which have already been mentioned for the semiconductor device according to the invention also apply to the method according to aspects of the invention.

BRIEF DESCRIPTION OF DRAWINGS

Further objects of the invention will ensue from the following description of example embodiments of the invention with reference to the accompanying drawings, wherein.

DETAILED DESCRIPTION

Figure 1:
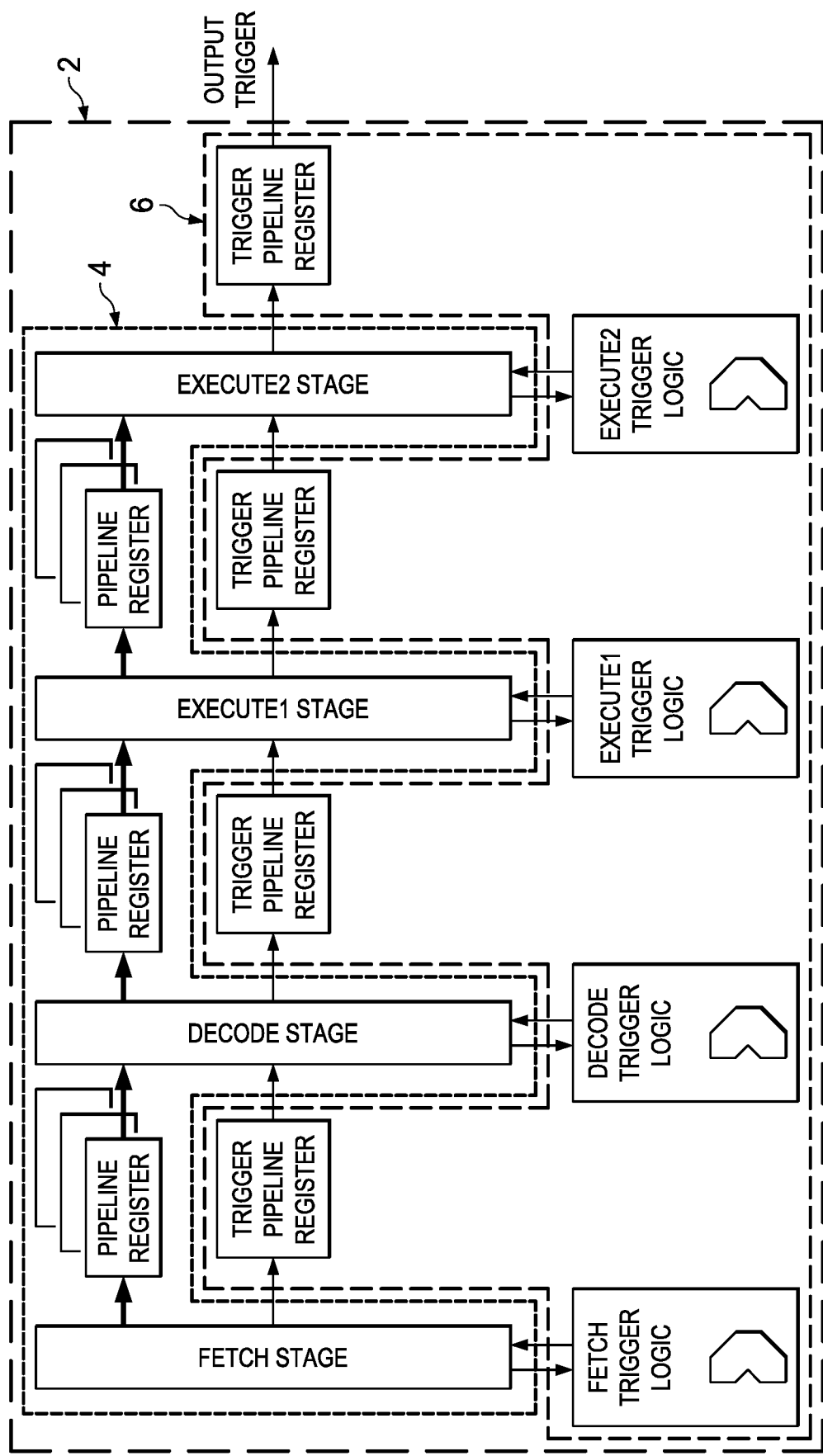
FIG. 1 is a simplified block diagram for a semiconductor device comprising a pipelined processor and a pipeline flattener according to an embodiment of the invention.

FIG. 1 is a simplified block diagram of a semiconductor device 2 comprising a processor 4 and a pipeline flattener 6. The processor pipeline comprises a fetch stage, a decode stage (both named as such), a first execution stage (execute1 stage) and a second execution stage (execute2 stage). A plurality of pipeline registers (pipeline reg) is coupled between the abovementioned pipeline stages. The pipeline flattener 6 comprises a plurality of logic units, namely a fetch trigger logic, a decode trigger logic, an execute1 trigger logic and an execute2 trigger logic (all named as such).

Further, trigger pipeline registers (trigger pipeline reg) are coupled between the stages of the processor 4. If an instruction enters the fetch stage of the processor 4, the fetch trigger logic of the pipeline flattener 6 determines whether this instruction is selected for debug tracking or not. This may be performed by comparing the bus of the fetch stage with a predetermined value. A bus comparator may be suitable for this operation. If the instruction is selected for tracking, the trigger is set to a value which is indicative thereto. In one embodiment the instruction is assigned a trigger=1 if the instruction is selected for debug tracking and trigger=0 if not. Accordingly, the first trigger register which is coupled between the fetch stage and the decode stage is set to "1". The fetched instruction is fed through the pipeline of the processor 4.

The instruction proceeds to a subsequent pipeline stage every clock cycle. The assigned trigger value forwarded from one trigger pipeline register to the next in the same way. The instruction and the trigger are in synchrony.

Advantageously, the trigger logic which is coupled to the different stages of the processor pipeline is enabled to determine whether or not the instruction that is currently under execution is selected for tracking by simply reading out the trigger value. According to another embodiment, the debug logic may send back the trigger at the end of the pipeline stage (see the last trigger pipeline register which is coupled to the second execution stage (execute2 stage)). This trigger may be considered if an additional data transaction of the same instruction takes place. This allows creating complex debug scenarios considering several data accesses performed in different pipeline stage.

Figure 2:
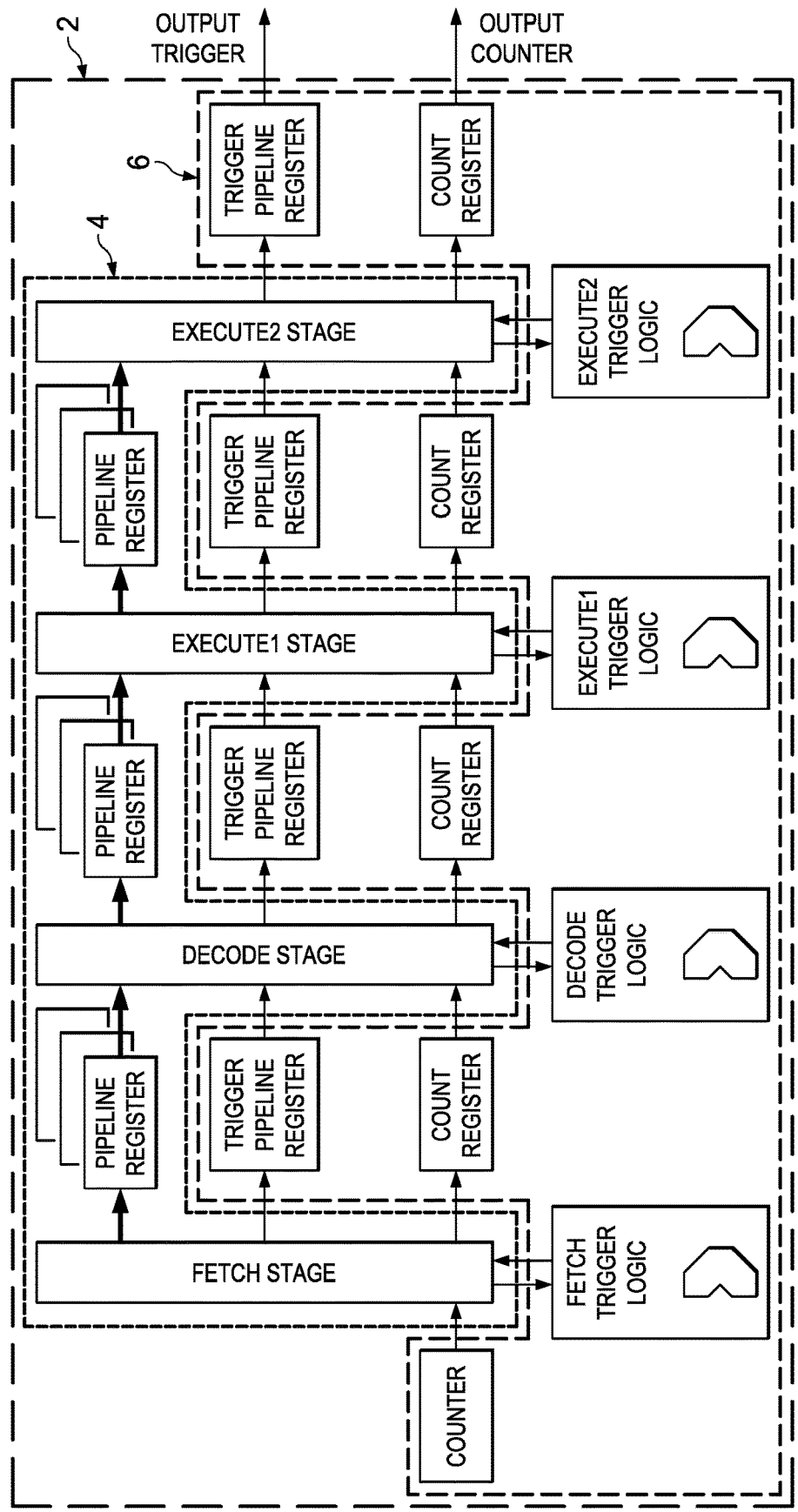
FIG. 2 is another simplified block diagram for a semiconductor device according to another embodiment of the invention, FIG. 3 schematically illustrates the bus activity during a plurality of subsequent clock cycles according to an embodiment of the invention, FIG. 4 exemplarily illustrates a pipeline flow inside a pipelined processor.

FIG. 2 is another simplified block diagram of a semiconductor device 2 comprising a processor 4 and a pipeline flattener 6. In comparison to the semiconductor device 2 in FIG. 1, this semiconductor device 2 in FIG. 2 is supplied with an additional counter and additional counter registers (both named as such). An instruction entering the fetch stage of the processor pipeline is assigned a specific counter number. During execution of this instruction in the subsequent processor stages, the instruction may be identified by this counter value that is stored in the counter registers. Similar to the trigger, the counter is forwarded through the counter registers in synchrony with the instruction in the processor pipeline. A subsequent instruction which is fetched by the fetch stage of the processor 4 is given a different counter, e.g. a subsequent counter number.

Advantageously, the counter provides cyclic numbers to the instructions entering the processor pipeline. According to the embodiment in FIG. 2, four processor pipeline stages are present and accordingly the counter will preferably assign counter values ranging from 1 to 4. The counter registers may have a suitable bit depth. According to the embodiment, a 2-bit register is sufficient since it is capable of storing numbers ranging from 1 to 4.

Figure 3:
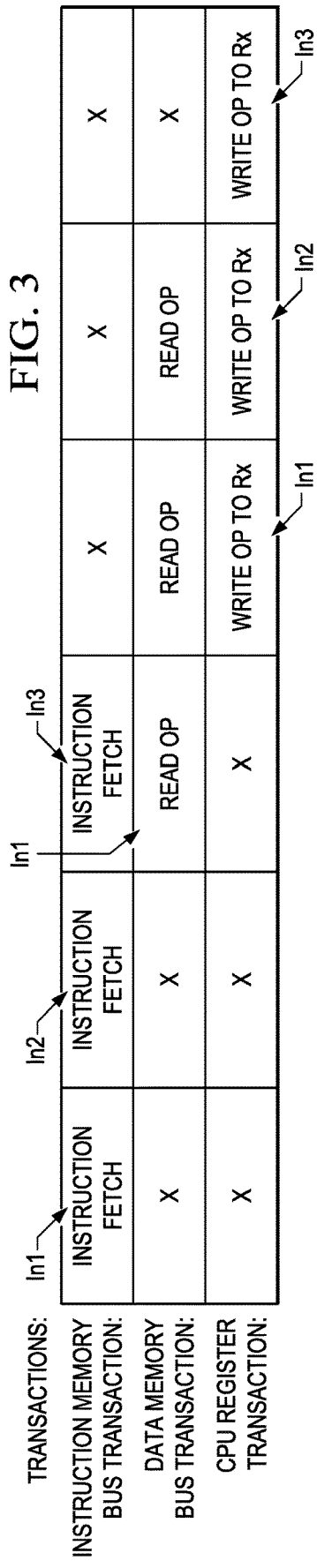
Figure 4:
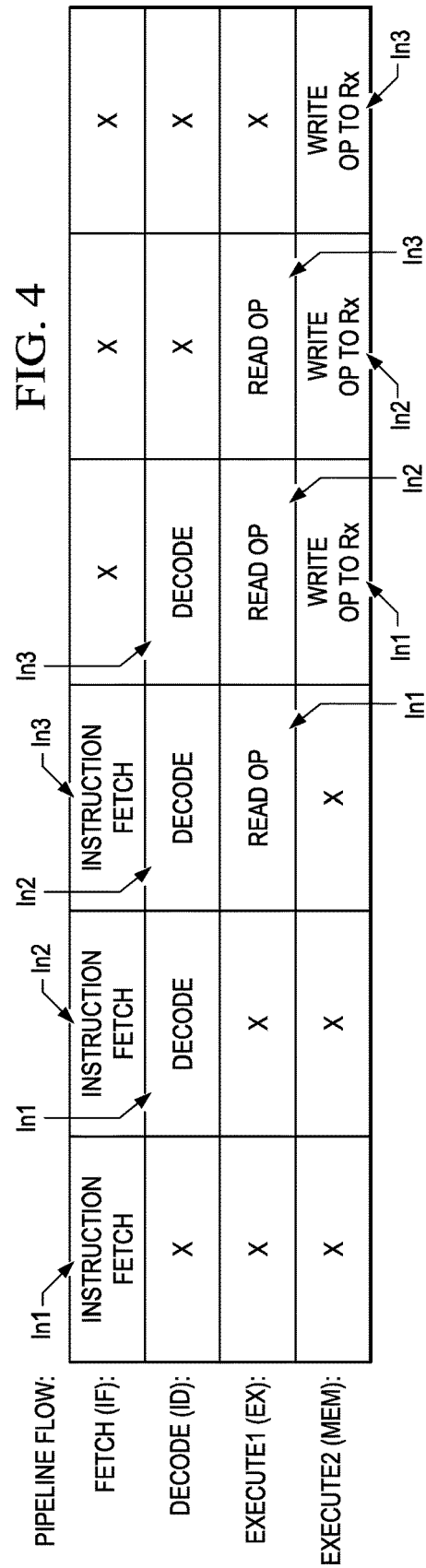

FIGS. 3 and 4 schematically illustrate the operation of pipelined processor. FIG. 3 shows the bus activity during a plurality of subsequent clock cycles. Exemplarily, the processor has a separate instruction and data bus. Instructions In1 to In3 are fetched during the first three clock cycles and accordingly this action may be monitored at the bus of the instruction fetch stage. During the third clock cycle, the first instruction performs a read operation. The second and third instruction follows in the subsequent clock cycles. Finally, during the last clock cycles, the three instructions In1 to In3 perform a write operation which may be monitored at the CPU bus. FIG. 4 shows the corresponding flow of the three instructions In1 to In3 inside the processor pipeline.

Figure 5:
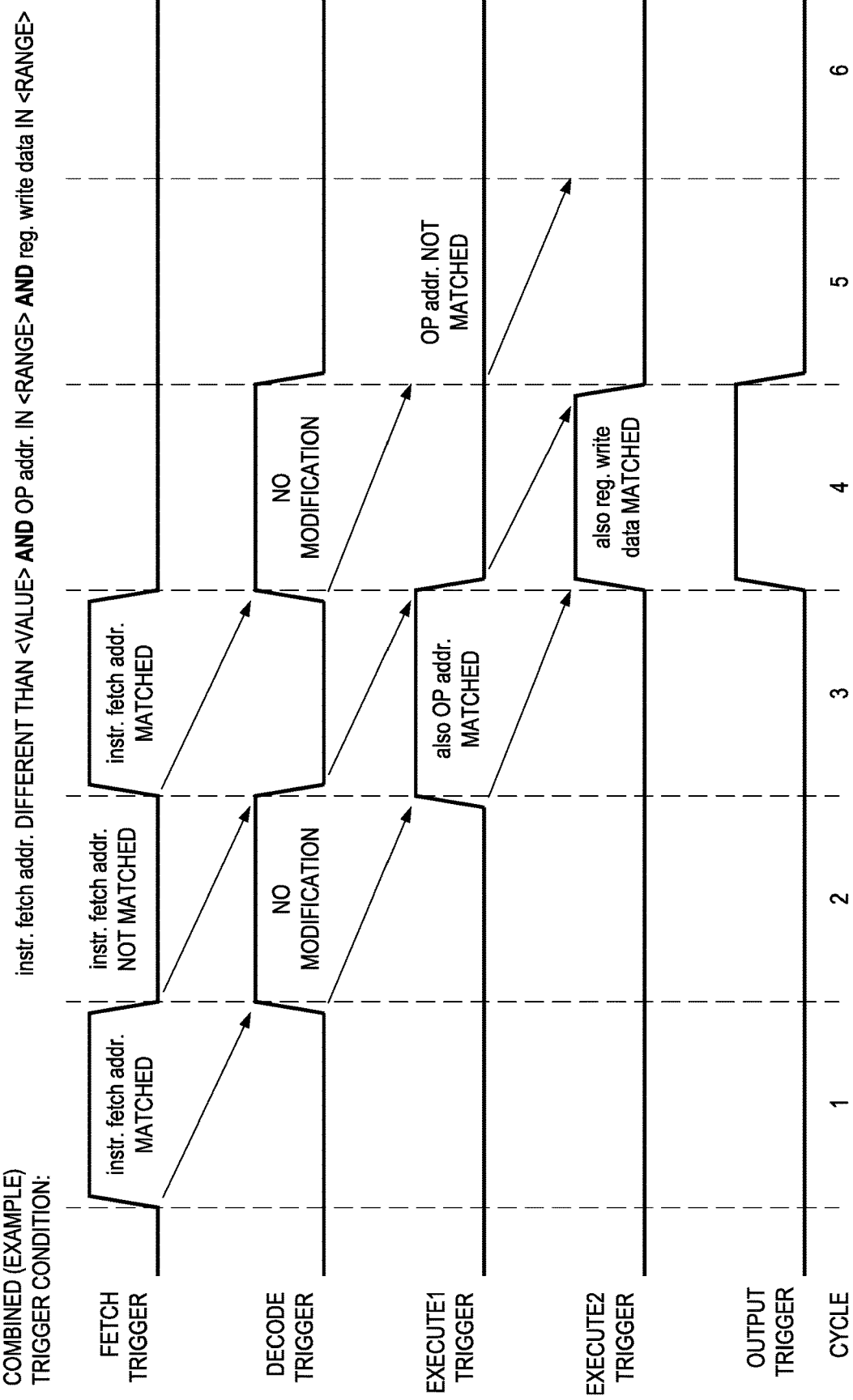
FIG. 5 is a time-dependent diagram showing trigger signals inside a pipeline flattener according to another embodiment of the invention.
Figures 6, 7:
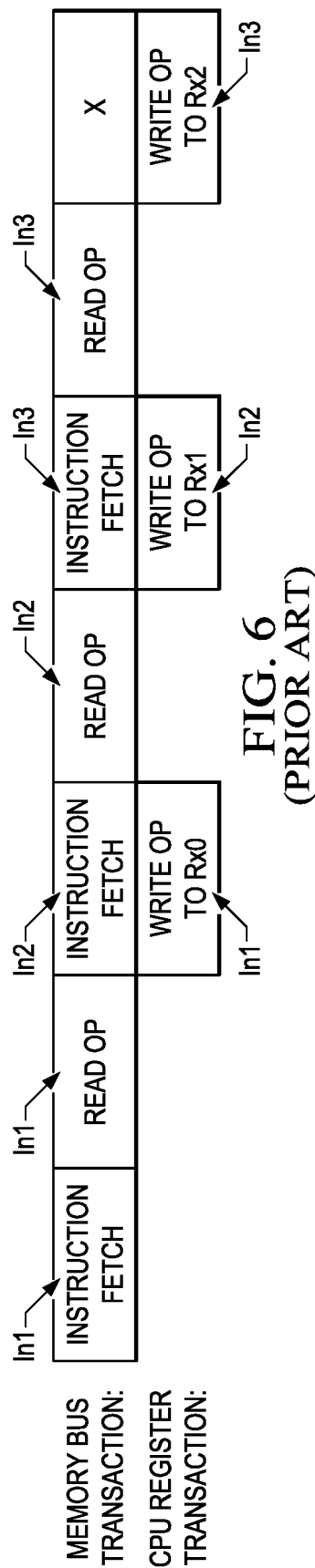
FIG. 6 illustrates the bus activity of a non-pipelined processor according to the prior art, FIG. 7 schematically illustrates the pipeline activity during operation of a typical RISC processor.
Figure 8:
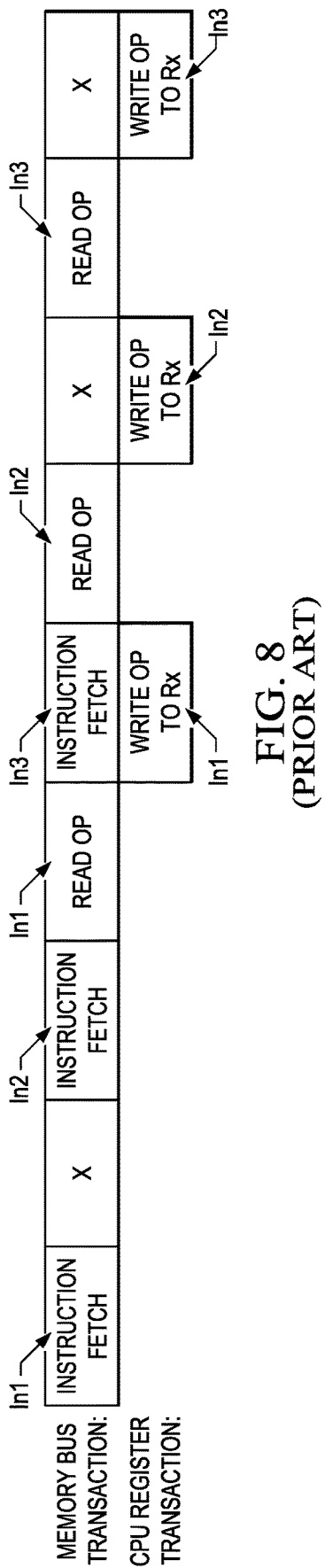
FIG. 8 illustrates the bus activity of a processor having a pipelined architecture according to the prior art and FIG. 9 is a simplified pipeline flattener according to the prior art.
Figure 9:
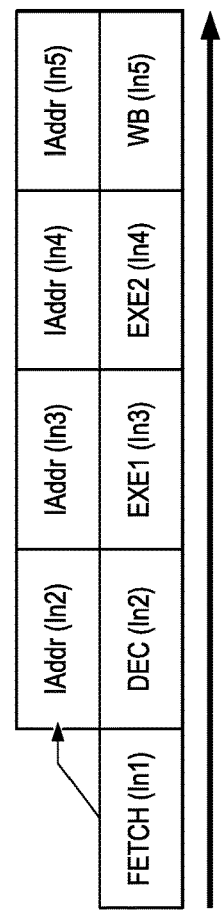

FIG. 5 is a simplified time-dependent diagram illustrating the propagation of trigger signals inside the pipeline flattener 6, according to an embodiment of the invention. Exemplarily, a time span of six clock cycles (see row "cycle") is depicted. A complex debug breakpoint is exemplarily defined by: "Instruction fetch address" different than a certain value AND "Operating address" in a certain range AND "register write data" in a certain range. At the beginning, i.e. at the signal fetch stage, it is assumed that the fetched instruction matches the predetermined address. Accordingly, the trigger signal changes from low to high. In a subsequent clock cycle, the trigger signal is forwarded to the decode stage (see the second row that is named: "Decode Trigger"). During this stage, no modification of the trigger value is performed. In a third clock cycle, the instruction reaches the first execution stage (see row: "Execute1 Trigger").

The second breakpoint condition is checked. If the operating address is located within a certain range, the trigger signal stays high. Exemplarily, this is the case. In a fourth clock cycle, the third trigger condition, namely whether the register write data is located within a certain range is checked. The trigger will stay high if this condition is matched (see row "Execute2 Trigger"). Subsequently, the trigger output (named as such) is high at the end of the pipeline, because all breakpoint conditions are matched.

For an exemplary second signal which is fetched at the fetch stage, the trigger stays low because the instruction fetch address is not matched (see the second clock cycle in the row "Fetch Trigger"). This low trigger value follows through the different stages of the pipeline and remains low till the end of the pipeline.

A further example for a trigger signal traveling through the pipeline stages starts in the third clock cycle of the row "Fetch Trigger". A positive match of the first breakpoint condition, namely that the instruction address matches the respective range, sets the trigger value to "high". No modification is carried out during the decode stage. However, the operating address is not matched and accordingly in the fifth clock cycle the trigger signal is set to "low". Subsequently, there is no output of the trigger signal in the sixth clock cycle as it is indicated by the low value of the output trigger.

Although the invention has been described hereinabove with reference to specific embodiments, it is not limited to these embodiments and no doubt further alternatives will occur to the skilled person that lie within the scope of the invention as claimed.

What is claimed is:

1. An apparatus comprising:
a processor that includes:
a memory to store an instruction;
a processing pipeline to execute the instruction and having pipeline stages arranged in a sequence, the pipeline stages including a first pipeline stage that is an initial pipeline stage of the sequence and a last pipeline stage that is a final pipeline stage in the sequence; and
trigger registers, each trigger register being associated with a respective one of the pipeline stages;
wherein, in response to the instruction being received by the first pipeline stage, the processor is configured to:
select a trigger value as one of a first trigger value and a second trigger value depending on whether the instruction is selected for debug tracking;
cause the selected trigger value to be stored in a first trigger register of the trigger registers, the first trigger register being associated with the first pipeline stage; and
cause the selected trigger value to be forwarded through all remaining trigger registers associated with each pipeline stage subsequent to the first pipeline stage.

2. The apparatus of claim 1, wherein processor is configured to:
provide tracked debug data related to execution of the instruction when a trigger register associated with the last pipeline stage stores the first trigger value; and
not provide tracked debug data related to execution of the instruction when the trigger register associated with the last pipeline stage stores the second trigger value.

3. The apparatus of claim 2, comprising a debug unit, wherein, when the trigger register associated with the last pipeline stage stores the first trigger value, the tracked debug data is provided to the debug unit.

4. The apparatus of claim 1, wherein each trigger register has an input coupled to an output of its respective pipeline stage.

5. The apparatus of claim 1, wherein the forwarding of the selected trigger value through the remaining trigger registers is in synchrony with movement of the instruction through each pipeline stage subsequent to the first pipeline stage.

6. The apparatus of claim 1, wherein the first pipeline stage is an instruction fetch stage of the processing pipeline.

7. The apparatus of claim 1, wherein the processing pipeline includes pipeline registers, the pipeline registers including at least one pipeline register arranged between every two adjacent pipeline stages of the sequence.

8. The apparatus of claim 7, wherein each of the pipeline registers is arranged between two adjacent pipeline stages of the sequence in parallel with a respective one of the trigger registers.

9. The apparatus of claim 1, comprising:
a counter unit to provide a counter value associated with the instruction; and
counter registers, wherein each counter register is associated with a respective one of the pipeline stages and is configured to store the counter value, and wherein each counter register is arranged in parallel with a respective one of the trigger registers.

10. The apparatus of claim 1, wherein the apparatus is an integrated circuit.

11. The apparatus of claim 10, wherein the integrated circuit comprises a microcontroller or a system-on-chip (SoC).

12. A method comprising:
receiving, by a processing pipeline of a processor, an instruction to be executed, the processing pipeline having a plurality of pipeline stages arranged in a sequence, wherein the pipeline stages have a first pipeline stage that is an initial pipeline stage of the sequence and a last pipeline stage that is a final pipeline stage in the sequence;
selecting a trigger value from one of a first trigger value and a second trigger value dependent on whether the instruction is selected for debug tracking;
outputting the selected trigger value from the initial pipeline stage;
storing the selected trigger value in a first trigger register of a plurality of trigger registers, each of the trigger registers being associated with a respective one of the pipeline stages; and
forwarding the selected trigger value from the first trigger register through all remaining trigger registers associated with each pipeline stage subsequent to the first pipeline stage.

13. The method of claim 12, comprising:
providing tracked debug data related to execution of the instruction by the processing pipeline when a trigger register associated with the last pipeline stage stores the first trigger value; and
not providing tracked debug data related to execution of the instruction by the processing pipeline when the trigger register associated with the last pipeline stage stores the second trigger value.

14. The method of claim 13, comprising providing the tracked debug data from the last pipeline stage to a debug unit.

15. The method of claim 12, wherein the forwarding of the selected trigger value through the remaining trigger registers is in synchrony with movement of the instruction through the plurality of pipeline stages.

16. The method of claim 12, wherein the first pipeline stage is an instruction fetch stage of the processing pipeline.

\* \* \* \* \*